US006980540B1

United States Patent
Laroia et al.

(10) Patent No.: US 6,980,540 B1
(45) Date of Patent: Dec. 27, 2005

(54) APPARATUS AND METHOD FOR ACQUIRING AN UPLINK TRAFFIC CHANNEL, IN WIRELESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 884 days.

(21) Appl. No.: 09/641,636

(22) Filed: Aug. 16, 2000

(51) Int. Cl.$^7$ .............................................. H04Q 7/38
(52) U.S. Cl. ..................................... 370/345; 370/337
(58) Field of Search ............................ 370/321–2, 337, 370/346–8

(56) References Cited

U.S. PATENT DOCUMENTS

| | | | | |
|---|---|---|---|---|
| 5,355,516 A | * | 10/1994 | Herold et al. | 455/510 |
| 5,436,906 A | | 7/1995 | Kasuya et al. | |
| 5,818,826 A | | 10/1998 | Gfeller et al. | |
| 6,031,832 A | * | 2/2000 | Turina | 370/348 |
| 6,295,453 B1 | * | 9/2001 | Desgagne et al. | 455/448 |
| 6,424,645 B1 | * | 7/2002 | Kawabata et al. | 370/347 |
| 6,430,417 B1 | * | 8/2002 | Raith et al. | 455/466 |
| 6,707,808 B1 | * | 3/2004 | Vedrine | 370/337 |

FOREIGN PATENT DOCUMENTS

| | | |
|---|---|---|
| EP | 0938193 A1 | 8/1999 |

OTHER PUBLICATIONS

Ojanpera et al. "An Overview of Air Interface Multiple Access for IMT-2000/UMTS", IEEE. Sep. 1998. pp. 82-86.*
European Search Report, 3pages, Apr. 12, 2002.

* cited by examiner

*Primary Examiner*—Ricky Ngo
*Assistant Examiner*—Derrick W Ferris

(57) ABSTRACT

Uplink traffic channel allocation is realized by utilizing a dedicated control channel in which a prescribed portion of the control channel resource, for example, frequency, time slot or the like, is reserved for transporting the uplink traffic channel requests. Both the base station and the particular mobile unit know the prescribed portion of the control channel resource a priori. Consequently, when the particular mobile unit transmits an uplink traffic channel request via the prescribed portion of the control channel resource there is no need for adding any control header information, thereby minimizing overhead. Furthermore, the length of the uplink traffic channel requests can be optimally chosen without constraints imposed by other control message schemes. Reduced overhead coupled with the prescribed portion of the control channel resource arriving quite frequently reduces latency in the particular mobile unit acquiring an uplink traffic channel. In one example, delivery of adequate uplink traffic channel request information to the base station, while minimizing the adverse impact of losing requests, is ensured by persistently transmitting the requests. Specifically, after the mobile unit transmits a first request, it transmits a second or even a third request instead of waiting to receive a response message from the base station and/or waiting for a timer to time out. By the mobile unit using such a persistent request transmission scheme, the base station can readily determine the true value of the received request by eliminating the transmission loop delay effect, thereby allowing a sensible assignment decision to be made.

17 Claims, 4 Drawing Sheets

APPARATUS AND METHOD FOR ACQUIRING AN UPLINK TRAFFIC CHANNEL, IN WIRELESS COMMUNICATIONS SYSTEMS

TECHNICAL FIELD

This invention relates to wireless communications systems and, more particularly, to wireless communications between mobile units and base stations.

BACKGROUND OF THE INVENTION

Figure 1:
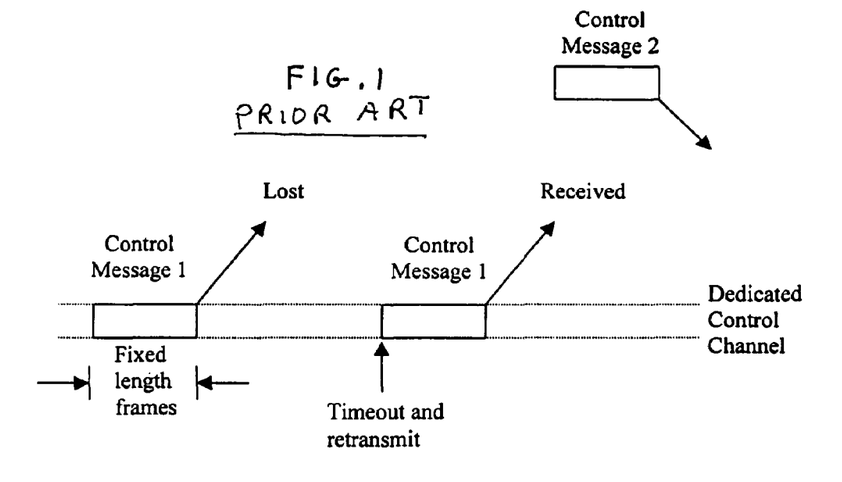
FIG. 1 graphically illustrates the use of a dedicated control channel for transmitting uplink traffic channel requests in prior known systems.

The basic mechanism in wireless communication systems for acquiring an uplink traffic channel between a base station and one or more mobile units to transmit data is to provide each mobile unit with a dedicated control channel for exchanging control messages. One such wireless system is the Orthogonal Frequency Division Multiplex (OFDM) based spread spectrum multiple access system. A representation of a dedicated control channel including messages transported on it is shown in FIG. 1. Fixed length control messages are used and a so-called one size fits all approach is utilized to determine the length of control messages. Consequently, the length of the control messages corresponds to the longest message that has to be transported on the dedicated control channel. One such control message is a request for a traffic channel that is typically shorter than the longest control message. These control messages also have headers that indicate the structure and type of control message. Since the request messages have to be packaged into the standard fixed length control message there is overhead. Additionally, if the request messages have to be transmitted frequently to compensate for changing mobile unit traffic requirements and to reduce the adverse impact of losing traffic requests, the wireless system incurs a significant amount of overhead and becomes quite inefficient. The length of the fixed control message also increases latency in conveying the requests to the base station and receiving responses from the base station.

SUMMARY OF THE INVENTION

Problems and limitations of prior uplink traffic channel allocation arrangements are addressed by utilizing, i.e. formatting an exclusively dedicated control channel in which a prescribed portion of the control channel resource, for example, frequency, time slot or the like, is reserved for transporting the uplink traffic channel requests. Both the base station and the particular mobile unit know the prescribed portion of the control channel resource a priori. Consequently, when the particular mobile unit transmits an uplink traffic channel request via the prescribed portion of the control channel resource there is no need for adding any control header information, thereby minimizing overhead. Furthermore, the length of the uplink traffic channel requests can be optimally chosen without constraints imposed by other control message schemes. Reduced overhead coupled with the prescribed portion of the control channel resource arriving quite frequently reduces latency in the particular mobile unit acquiring an uplink traffic channel.

In one example, delivery of adequate uplink traffic channel request information to the base station, while minimizing the adverse impact of losing requests, is ensured by persistently transmitting the requests. Specifically, after the mobile unit transmits a first request, it transmits a second or even a third request instead of waiting to receive a response message from the base station and/or waiting for a timer to time out.

By the mobile unit using such a persistent request transmission scheme, the base station can readily determine the true value of the received request by eliminating the transmission loop delay effect, thereby allowing a sensible assignment decision to be made.

DETAILED DESCRIPTION

As indicated above, FIG. 1 graphically illustrates the use of a dedicated control channel for transmitting uplink traffic channel requests in prior known systems. Mobile units, for example, 202-1 through 202-Y of FIG. 2, have a dedicated control channel (DCCH) that is used for exchanging various kinds of control messages. Control messages are transmitted over a fixed length frame. The length of the control message frames is determined with a one size fits all approach in order that various types of control messages can be fitted into the common control message frame. One of the messages that is transmitted over this dedicated channel is a request for a traffic channel by a mobile unit. When such a control message is transmitted the mobile unit typically waits for a response control message from the base station, for example, 201 FIG. 2, and in case there is no response in a prescribed time interval, the mobile unit "times out" and retransmits the request control message. Upon receipt of a response message the mobile unit can then transmit data to the base station using the granted traffic channel.

In this prior arrangement, the control messages have a fixed length, which is determined by the length of the largest message that needs to be conveyed on the DCCH. This length is typically much longer than is needed for request control messages. They also have headers that indicate the structure and type of the control message. Since the requests have to be packaged into the standard control message frame there is overhead. If these messages have to be transmitted frequently to allow for changing mobile unit traffic needs, this prior system incurs a significant amount of overhead and becomes quite inefficient. Moreover, because of the length of the control message there is also an increase in latency in conveying the requests and getting responses.

Figure 2:
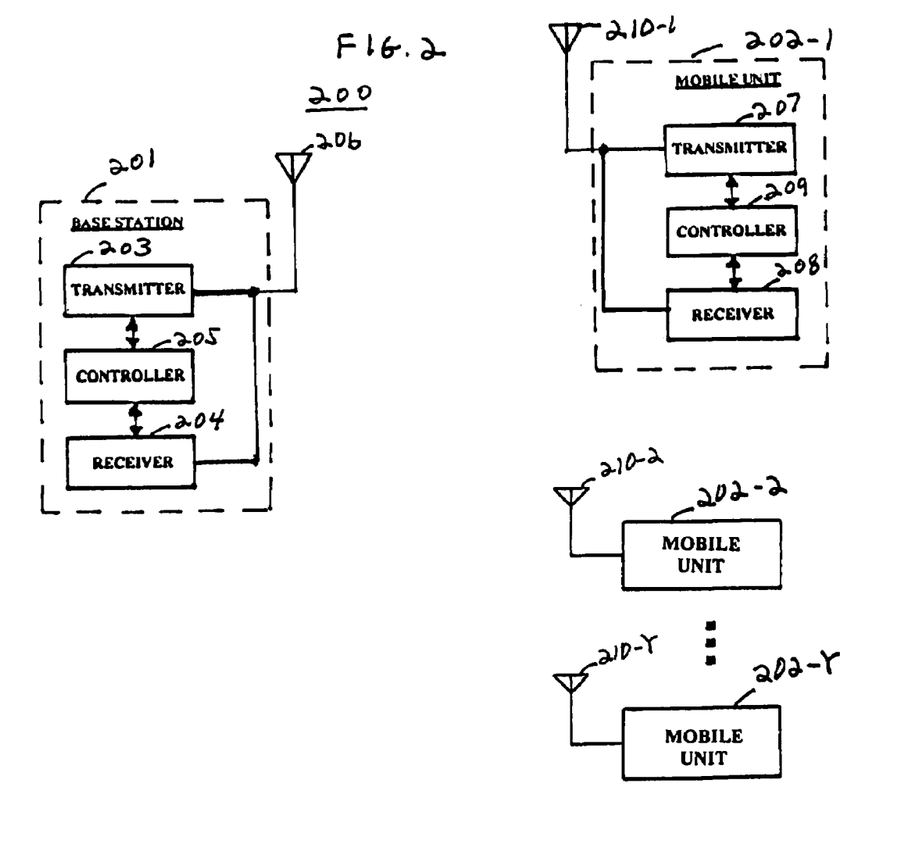
FIG. 2 shows, in simplified block diagram form, details of a base station and a plurality of mobile units in which the invention may be employed.

FIG. 2 shows, in simplified block diagram form, details of a wireless mobile communications system including base station 201 and a number of mobile units 202-1 through 202-Y in which the invention may be advantageously employed. In this example, base station 201 includes transmitter 203, receiver 204 and controller 205 for transmitting and receiving wireless messages via antenna 206. Controller 205 is employed to control operation of transmitter 203 and receiver 204, in accordance with the invention. Similarly, in this example, each of mobile units 202-1 through 202-Y includes transmitter 207, receiver 208 and controller 209 for transmitting and receiving wireless messages via antenna 210. Controller 209 is employed to control operation of transmitter 207 and receiver 208, in accordance with the invention. One such wireless system that may be employed for system 200 is the Orthogonal Frequency Division Multiplex (OFDM) based spread spectrum multiple access system.

Figure 3:
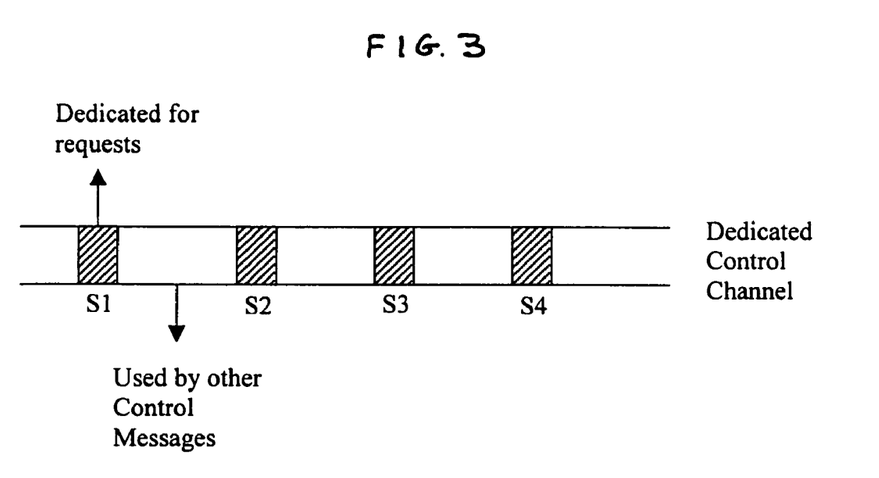
FIG. 3 graphically illustrates the use of a dedicated control channel and a prescribed format for transmitting uplink traffic channel requests in accordance with the invention.

FIG. 3 graphically illustrates the use of a dedicated control channel and a prescribed format for transmitting uplink traffic channel requests, in accordance with the invention. The uplink traffic channel requests are transmitted on a dedicated resource of the control channel, for example, time slots S1, S2, S3, and S4, while other control messages are conveyed with the rest of the control channel resource. In other words, the dedicated control channel is used exclusively by a particular one of mobile units 202-1 through 202-Y with a prescribed portion of the control channel resource being reserved exclusively for conveying the uplink traffic channel requests from that particular mobile unit. This is realized by transmitter 207 under control of controller 209 generating the control channel on which the uplink traffic channel requests are transported, in this example, on the prescribed portion of the control channel resource. The uplink traffic channel requests are typically formed from a group of contiguous bits in a prescribed portion of the control channel. For example, time slots S1, S2, S3 and S4, each including a set of contiguous bits could convey separate uplink traffic channel requests. Another mechanism that could be adopted is to convey uplink traffic channel requests using groups of contiguous bits. For example, time slots S1 and S2 could be used together to convey an uplink traffic channel request and time slots S3 and S4 could be used together to convey another uplink traffic channel request. Additionally, other control messages may be transmitted in bit positions between the time slots, for example, the bit positions between time slots S1 and S2, between time slots S2 and S3, between time slots S3 and S4, etc.

An advantage of using the prescribed dedicated control channel resource for conveying uplink traffic channel requests is that overhead has been eliminated from the control message. That is, headers or the like are not required. This is because both the base station 201 and the particular mobile unit 202 know a priori where the time slots are located in the control channel. Moreover, the number of bits in each of time slots S1 through S4 can be reduced to just the number of bits needed to convey the uplink traffic channel requests. The transmission of uplink traffic channel requests from the particular mobile unit 202 can be made persistently, i.e. periodically repeatedly, until the base station responds. This in turn eliminates latency related to the timing out of timers used in prior mobile units.

It should be noted that in general, the dedicated control channel is a low-rate channel. Moreover, the dedicated control channel has to be partitioned to convey requests and other control messages. Thus, the bandwidth of transmitting requests is very limited. On the other hand, in order to minimize the latency of transmitting requests, the dedicated resource of conveying requests should be available in a periodically recurring, i.e. repeating, manner with the inter-arrival times being kept small. Hence, the size of a request is small. As a result, the mobile unit 202-1 may not be able to convey much information in a request. In addition, as there may not be much coding gain to combat a hostile wireless channel, the probability of a request being lost is high. Therefore, in order to ensure adequate request information can be collectively delivered to the base station 201 and to minimize the adverse impact of losing requests, the mobile unit 202 persistently transmits requests. That is, after the first request is transmitted, the mobile unit 202-1 continues to transmit the second and even third requests instead of waiting for responses from the base station 201 and/or waiting for a timer expiration. This compares with prior arrangements in which the mobile unit 202-1 sets up a timer and waits for a response from base station 201 after transmitting an uplink traffic channel request.

Figure 4:
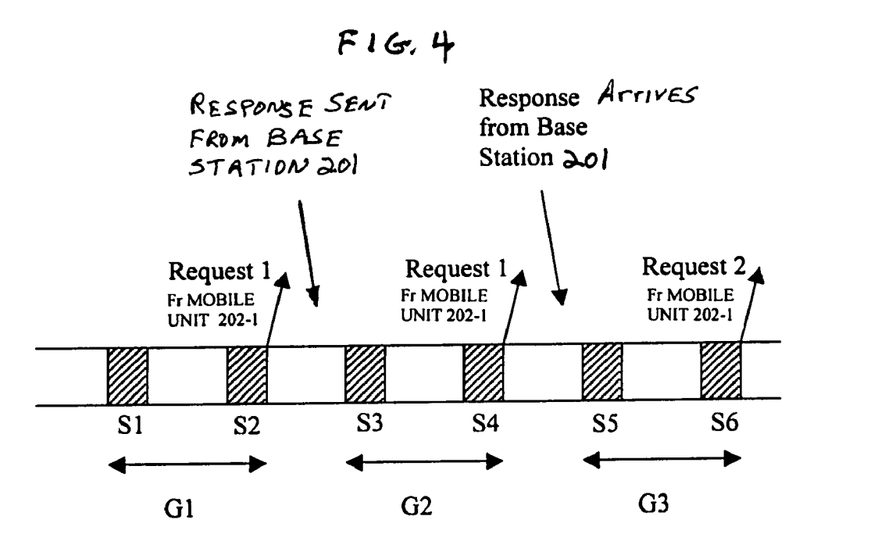
FIG. 4 is a graphical representation of the transmission of uplink traffic channel requests and downlink response messages useful in describing an aspect of the invention.

FIG. 4 is a graphical representation of the transmission of uplink traffic channel requests and downlink response messages useful in describing an aspect of the invention. Specifically, FIG. 4 illustrates the dynamic flow of the uplink traffic channel request transmission process. To this end, two contiguous bit blocks are grouped in this example, in groups G1 through G3. Specifically, in this example, group G1 includes time slots S1 and S2 and the intervening bit positions, group G2 includes time slots S3 and S4 and the intervening bit positions, Group G3 includes time slots S5 and S6 and the intervening bit positions, etc. As shown, the response to uplink traffic channel request 1 transmitted from mobile unit 202-1 in group G1 is transmitted from base station 201 between time slots S2 and S3 and received between time slots S4 and S5. Instead of waiting for this response from base station 201, mobile unit 202-1 retransmits uplink traffic channel request 1 in group G2. Mobile unit 202-1 then receives a response from the base station 201. Mobile unit 202-1 then could transmit an uplink traffic channel request 2 in group G3. Depending on the type of uplink traffic channel requests that are being transmitted there may be no need to transmit an uplink traffic channel request in group G3. The uplink traffic channel requests could be used to convey rate requests. In such an instance, once mobile unit 202-1 receives a response from the base station 201 there is nothing else transmitted in group G3. The requests could also be used to convey the status of a queue in mobile unit 202-1 to the base station 201. Upon receiving a response from base station 201, the mobile unit 202-1 transmits an updated queue status.

Figure 5:
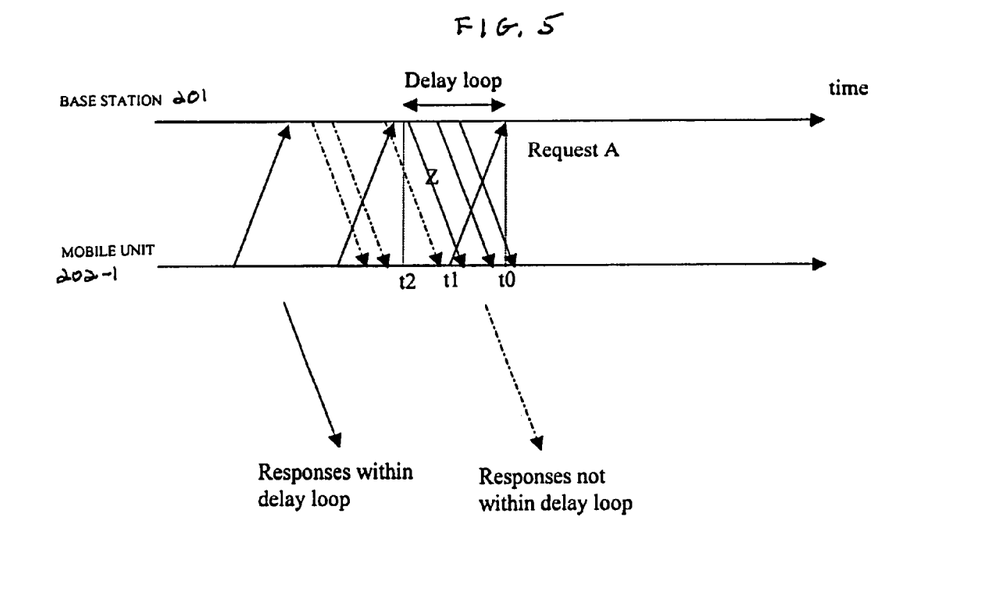
FIG. 5 is a graphical representation of a base station process in assignment of traffic channels in response to persistent request transmission from a mobile unit.

FIG. 5 is a graphical representation of a base station 201 process in assignment of uplink traffic channels in response to persistent uplink traffic channel request transmission from a mobile unit 202. Given the scheme employed in the mobile units 202, and in this example mobile unit 202-1, of persistently transmitting uplink traffic channel requests for traffic channels, the base station 201 has to employ an appropriate strategy to determine how to respond to the uplink traffic channel requests. A response transmitted from base station 201 via transmitter 203 under control of controller 205 and received by mobile unit 202-1 via receiver 208 under control of controller 209 contains the assignment of a prescribed dedicated traffic channel resource.

Given the persistent transmission scheme used in the mobile units 202, the base station 201 determines the true value of uplink traffic channel requests from the mobile units 202 by eliminating the delay loop effect existing in any practical system, so that a sensible assignment decision can be made. Briefly, when a mobile unit 202 transmits an uplink traffic channel request to base station 201, the particular mobile unit 202 is not aware of all the responses that have been transmitted by base station 201 within the delay loop. These responses may include certain traffic channel assignments. The so-called "true value" of the uplink traffic channel request is defined as the amount of the traffic channel resource that the particular mobile unit 202 would have requested if the particular mobile unit 202 had been aware of all the responses that had been transmitted by base station 201 within the delay loop.

It can be seen that if there was no delay, i.e., a delay of zero, from the time instant when the base station 201 transmits back a response to the mobile unit 202-1 based on a previous uplink traffic channel request to the time instant when the mobile unit 202-1 processes that response and transmits another uplink traffic channel request, to the time instant when that uplink traffic channel request is received by the base station 201, then the strategy is very simple. Basically, the base station 201 collects the requirements of the traffic channels from all the active mobile units 202, and then determines the channel assignment based on some prescribed scheduling policy. For example, the scheduling policy could be such that the traffic channel requests from mobile units 202 having a higher priority are always satisfied before the traffic channel requests of mobile units 202 that have a lower priority. However, in reality, a response needs some time interval to be transmitted from base station 201 and reach the particular mobile unit 202-1, and the particular mobile unit 202-1 needs some time interval to decode the response and to determine and transmit a new uplink traffic channel request. Finally, that new uplink traffic channel request needs some time interval to reach and be decoded by the base station 201. As shown in FIG. 5, when the base station 201 receives uplink traffic channel request A at time t0, because of the above processing/transmission/propagation delays, that uplink traffic channel request indeed does not reflect a few responses that were transmitted from base station 201 in the time interval of (t2, t0). The reason is that when uplink traffic channel request A was transmitted from the mobile unit 202-1 at time t1, the mobile unit 202-1 had not been aware of those responses transmitted from base station 201 in time interval (t2, t0) and was thus unable to adjust the uplink traffic channel request accordingly.

For any uplink traffic channel request, we define the delay loop to be the time interval from when the oldest response, of which the uplink traffic channel request is independent, was transmitted, to when the uplink traffic channel request is received. As shown in FIG. 5, for uplink traffic channel request A, the oldest response of which uplink traffic channel request A is independent is response Z, which was transmitted at time t2. Therefore, the delay loop is from t2 to t0. The delay loop depends on several factors such as the transmission rates of the mobile unit 202 uplink traffic channel requests, the base station 201 responses, and the processing capability of the mobile unit 202 and the base station 201. However, in general, the delay loop is a system parameter, which is the same for all uplink traffic channel requests.

The strategy used in the base station 201 is to determine the "true" value of the uplink traffic channel request of mobile unit 202-1 from the received uplink traffic channel request in the first step and to then determine the traffic assignment in the second step. The delay loop affects the first step. Specifically, the "true" value of the uplink traffic channel request of mobile unit 202-1 is the value of the received uplink traffic channel request subtracted by the value of the total amount of traffic resource that has been assigned in the delay loop. Once the "true" value of the uplink traffic channel request of mobile unit 202-1 is determined, the effect of the delay loop is eliminated, and the second step is quite straightforward as discussed previously for the case where the delay is zero.

In general, depending on how assignments are made in the responses of base station 201, responses may not have a one-to-one mapping relation to uplink traffic channel requests. For example, there could be more than one response corresponding to a single uplink traffic channel request. Thus, the number of assignments in the delay loop may also vary.

Figure 6:
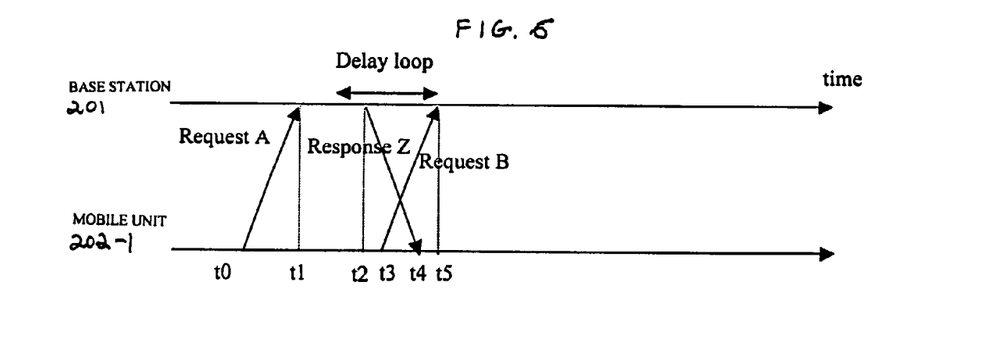
FIG. 6 is a graphical illustration of a process in which a mobile unit requests a traffic channel in terms of the rate of transmission of the data.

FIG. 6 is a graphical illustration of a process in which a mobile unit 202 requests a traffic channel in terms of the rate of transmission of the data. As shown in FIG. 6, this example illustrates an example in which the uplink traffic channel requests of mobile unit 202-1 and the corresponding assignments made by base station 201 are given in terms of rates. Specifically, at t0, uplink traffic arrives at the mobile unit 202-1. The mobile unit 202-1 transmits uplink traffic channel request A, which requests a traffic channel with a prescribed rate suitable to transmit the traffic. At time t1, uplink traffic channel request A is received by the base station 201. The base station 201 decides to assign a traffic channel as requested and transmits back to mobile unit 202-1 a response Z containing the assignment at time t2. However, before mobile unit 202-1 receives response Z, the mobile unit 202-1 transmits another uplink traffic channel request B at time t3, which contains the same rate request. Uplink traffic channel request B reaches the base station 201 at time t5. The base station 201 determines that the "true" value of uplink traffic channel request B is zero, as response Z is transmitted within the delay loop and the amount of traffic resource assigned in response Z exactly cancels out the amount of traffic resource that uplink traffic channel request B has requested. Hence, the base station 201 simply discards uplink traffic channel request B and takes no further action. After the mobile unit 202-1 receives response Z at time t4, the mobile unit 202-1 stops transmitting any more uplink traffic channel requests.

Figure 7:
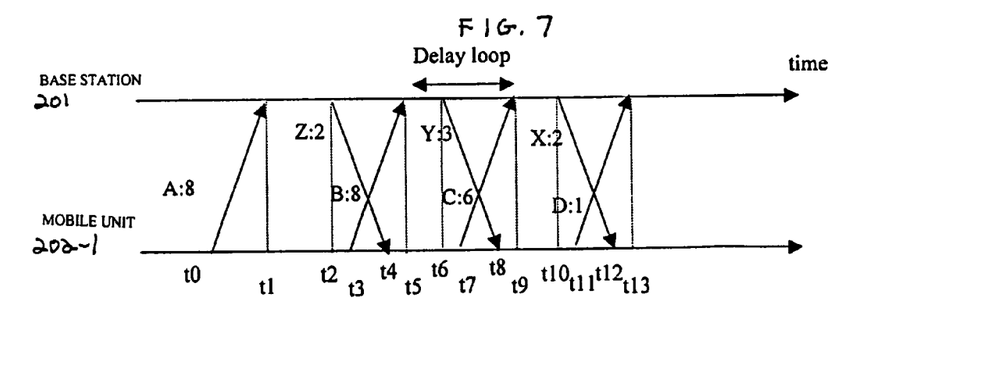
FIG. 7 is a graphical illustration of a process in which a mobile unit requests a traffic channel in terms of the number of frames required for transmission of the data.

FIG. 7 is a graphical illustration of a process in which a mobile unit 202 requests a traffic channel in terms of the number of frames required for transmission of the data. As shown in FIG. 7, an example is illustrated where the uplink traffic channel requests of mobile unit 202-1 and the assignments made by base station 201 are given in terms of frames. Specifically, at t0, uplink traffic arrives at the mobile unit 202-1. Suppose the traffic requires 8 frames of traffic channel resource to be transmitted. Thus, the mobile unit 202-1 transmits uplink traffic channel request A at time t0, which requests 8 frames. At time t1, uplink traffic channel request A is received by the base station 201. The base station 201 determines to assign 8 frames as requested. However, assume that because of a certain structure of transmitting traffic assignments, responses are not transmitted explicitly. Instead, the base station 201 broadcasts the assignments, one for each frame. In other words, the assignments of the 8 frames are transmitted one-by-one. Furthermore, the number of traffic frames that can be assigned to the mobile unit 202-1 is limited by the traffic channel resource availability of the system and the transmission/processing capability of the mobile unit 202-1. Therefore, the base station 201 may not be able to assign 8 traffic frames at one time.

Suppose at time t2, the base station 201 transmits a response Z assigning 2 frames, which reaches the mobile 202-1 at time t4. Meanwhile, unaware of the incoming assignments, the mobile unit 202-1 persistently transmits another uplink traffic channel request B of 8 frames at time t3, which reaches the base station 201 at time t5. As response Z is within the loop delay, the base station 201 subtracts the 2 assigned frames from uplink traffic channel request B and determines that the "true" value of uplink traffic channel request B is actually 6 frames. Suppose the base station 201 transmits a response Y assigning 3 frames at time t6, which reaches the mobile unit 202-1 at time t8. Meanwhile, after receiving response Z, the mobile unit 202-1 transmits an uplink traffic channel request C of 6 frames at time t7, which reaches the base station 201 at time t9. After receiving uplink traffic channel request C, the base station 201 determines that the "true" value of uplink traffic channel request C is actually 3 frames. Suppose the base station 201 transmits response X assigning 2 frames at time t10, which reaches the mobile unit 202-1 at time t12. Now suppose after time t7, a portion of remaining traffic (e.g. 2 frames) drops at the mobile 202-1, e.g., because it is real-time traffic and misses the deadline. Consequently, the mobile unit 202-1 has only 1 frame to be transmitted. The mobile unit 202-1 then transmits uplink traffic channel request D for 1 frame at time t11, which reaches the base station 201 at time t13. At time t12, the mobile unit 202-1 transmits the last frame in one of the two assigned frame resources and then stops transmitting any more uplink traffic channel requests. After receiving uplink traffic channel request D at time t13, the base 201 determines that the "true" value of uplink traffic channel request D is actually −1 frames, which indicates that the traffic channel resource has been over-assigned. Hence, the base station 201 discards uplink traffic channel request D and takes no further action.

Figure 8:
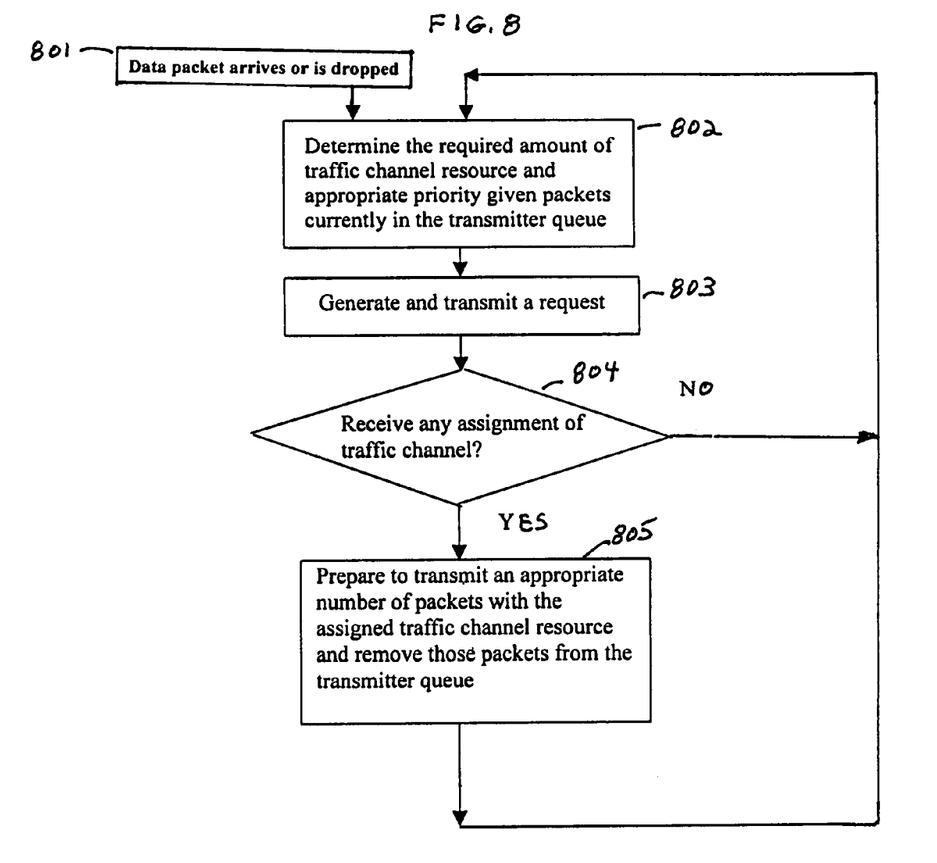
FIG. 8 is a flow chart illustrating the steps in the process of a mobile unit transmitting traffic channel requests.

FIG. 8 is a flow chart illustrating the steps in the process of a mobile unit 202 transmitting traffic channel requests. Specifically, in step 801 data, in the form of packets in this example, arrives or is dropped from a queue in transmitter 207 of mobile unit 202-1 (FIG. 2). In step 802, mobile unit 202-1 determines the required amount of a traffic channel resource required and the appropriate priority given data packets presently in the queue of transmitter 207 of mobile unit 202-1. Then, in step 803, mobile unit 202-1 generates and transmits an uplink traffic channel request in the dedicated uplink traffic channel request time slots. Step 804 monitors responses from base station 201 to determine whether any assignment of an uplink traffic channel has been received. If the test result in step 804 is NO, control is returned to step 802 and steps 802 through 804 are iterated until step 804 yields a YES result. Step 804 yielding a YES result indicates that an uplink traffic channel assignment has been received. Then, step 805 prepares mobile unit 202-1 to transmit an appropriate number of data packets on the assigned uplink traffic channel resource and causes those data packets to be removed from the queue of transmitter 207 of mobile unit 202-1. In this instance, the number of data packets in the transmitter 207 queue is generally changed. Then, step 802 causes mobile unit 202-1 to determine the required amount of uplink traffic channel resource and appropriate priority given to packets currently in the transmitter 207 queue of the mobile unit 202-1. Thereafter, the above process is repeated.

Figure 9:
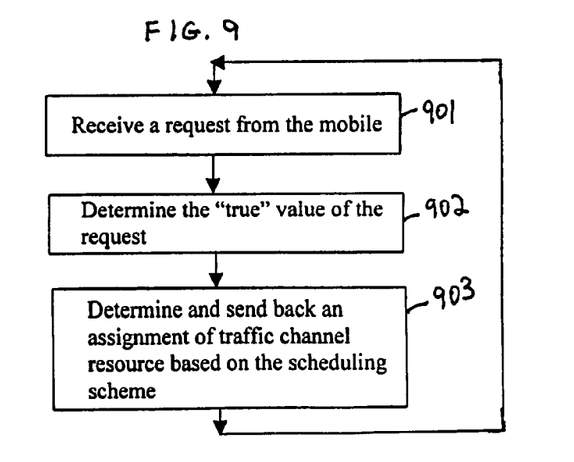
FIG. 9 is a flow chart illustrating the steps in the process of a base station processing the mobile unit requests in the assignment of a traffic channel.

FIG. 9 is a flow chart illustrating the steps in the process of a base station 201 processing the mobile unit requests in the assignment of a traffic channel. In step 901 base station 201 monitors the dedicated uplink traffic channel request time slots to detect an uplink traffic channel request from a remote mobile unit 202-1. Upon receiving an uplink traffic channel request, base station 201, in step 902, is caused to determine the "true" value of the uplink traffic channel request as described above. Then, step 903 based on the determined true value from step 902, causes base station 201 to determine and transmits via transmitter 203 an assignment of an uplink traffic channel resource based on a prescribed scheduling scheme to mobile unit 202-1.

The above-described embodiments are, of course, merely illustrative of the principles of the invention. Indeed, numerous other methods or apparatus may be devised by those skilled in the art without departing from the spirit and scope of the invention.

What is claimed is:

1. Apparatus for use in a wireless communications base station comprising:

A receiver for monitoring at least one prescribed portion of a control channel resource of an incoming control channel to detect an incoming unlink traffic channel request from at least one mobile unit to which said at least one prescribed portion of said control channel resource is exclusively dedicated, said traffic channel request being periodically repeatedly transmitted by said at least one mobile unit;

a detector for determining whether any uplink traffic channel requests have been received and, when an uplink traffic channel request has been detected, assigning a traffic channel to said at least one requesting mobile unit;

a transmitter responsive to a determination that at least one request has been received for transmitting a request response message including said traffic channel assignment to said at least one requesting mobile unit;

wherein said at least one mobile unit and said base station a priori know the location of said prescribed portion of said control channel resource in said control channel, wherein control header information that indicates at least a structure of said control message is not required to be transmitted with said uplink traffic channel requests; and a utilization apparatus adapted to utilize said received traffic channel request to determine the true value of said received traffic channel request by subtracting an amount of traffic channel resource that has been assigned to said mobile unit that is not known to the mobile unit as being assigned at the time said mobile unit transmitted an uplink traffic channel request from an amount of said traffic channel resource requested in said transmitted uplink traffic channel request.

2. The apparatus as defined in claim 1 wherein said wireless communications base station is for use in an orthogonal frequency division multiplex multiple access wireless communication system.

3. The apparatus as defined in claim 1 wherein said request response message includes a traffic channel assignment for said at least one mobile unit.

4. The apparatus as defined in claim 1 wherein said true value of said traffic channel request is utilized to generate an uplink traffic channel assignment for said at least one mobile unit that transmitted the traffic channel request.

5. The apparatus as defined in claim 4 wherein said uplink traffic channel assignment is based on the transmission rate of data to be transported on said assigned traffic channel.

6. The apparatus as defined in claim 4 wherein said uplink traffic channel assignment is based on the number of frames required to transport data on said assigned traffic channel.

7. Apparatus for use in a wireless mobile communication system comprising:
 a plurality of mobile units, wherein each of said mobile units includes
  a formatter for formatting a control channel including a prescribed control channel resource having one or more time slots, said control channel being dedicated exclusively to a particular mobile unit and having a prescribed portion of said control channel resource reserved to transport uplink traffic channel requests, wherein each mobile unit has a distinct control channel and contention is eliminated on said uplink;
  a transmitter for transmitting said uplink traffic channel requests in said prescribed portion of said control channel resource to a base station;
  a receiver to receive a response including an uplink channel assignment from said base station; and
  a controller associated with said transmitter to control said transmitting to periodically repeating transmission of said uplink traffic channel request in prescribed one or more of said one or more time slots prior to said particular mobile unit receiving a response from said base station,
  wherein said particular mobile unit and said base station a priori know the location of said prescribed portion of said control channel resource in said control channel,
  wherein there is no need to include control header information that indicates at least a structure of said control message with said uplink traffic channel requests and latency is minimized in transmitting said uplink traffic channel requests; and
 a base station including
  a receiver for monitoring at least one prescribed portion of a control channel resource of an incoming control channel to detect an incoming uplink traffic channel request from at least one mobile unit to which said at least one prescribed portion of said control channel resource is exclusively dedicated, said traffic channel request being periodically repeatedly transmitted by said at least one mobile unit
  a detector for determining whether any uplink traffic channel requests have been received and, when an uplink traffic channel request has been detected, assigning a traffic channel to said at least one requesting mobile unit,
  a transmitter responsive to a determination that at least one request has been received for transmitting a request response message including said traffic channel assignment to said at least one requesting mobile unit,
  wherein said at least one mobile unit and said base station a priori know the location of said prescribed portion of said control channel resource in said control channel, wherein control header information is not required to be transmitted with said uplink traffic channel requests, and
  a utilization apparatus adapted to utilize said received traffic channel request to determine the true value of said received traffic channel request by subtracting an amount of traffic channel resource that has been assigned to said mobile unit that is not known to the mobile unit as being assigned at the time said mobile unit transmitted an uplink traffic channel request from an amount of said traffic channel resource requested in said transmitted uplink traffic channel request.

8. The system as defined in claim 7 wherein said wireless mobile communication system is an orthogonal frequency division multiplex multiple access wireless mobile communication system.

9. Apparatus for use in a wireless communications base station comprising:
 receiver means for monitoring at least one prescribed portion of a control channel resource of an incoming control channel to detect an incoming uplink traffic channel request from at least one mobile unit to which said at least one prescribed portion of said control channel resource is exclusively dedicated, said traffic channel request being periodically repeatedly transmitted by said at least one mobile unit;
 means for determining whether any uplink traffic channel requests have been received and, when an uplink traffic channel request has been detected, assigning a traffic channel to said at least one requesting mobile unit;
 means responsive to a determination that at least one request has been received for transmitting a request response message including said traffic channel assignment to said at least one requesting mobile unit;
 wherein said at least one mobile unit and said base station a priori know the location of said prescribed portion of said control channel resource in said control channel, wherein control header information that indicates at least a structure of said control message is not required to be transmitted with said uplink traffic channel requests; and
 means for utilizing said received traffic channel request to determine the true value of said received traffic channel request by subtracting an amount of traffic channel resource that has been assigned to said mobile unit that is not known to the mobile unit as being assigned at the time said mobile unit transmitted an uplink traffic charnel request from an amount of said traffic channel resource requested in said transmitted uplink traffic channel request.

10. The apparatus as defined in claim 9 wherein said request response message includes a traffic channel assignment for said at least one mobile unit.

11. The apparatus as defined in claim 9 wherein said true value of said traffic channel request is utilized to generate a traffic channel assignment for said at least one mobile unit that transmitted the traffic channel request.

12. A method for use in a wireless communications base station comprising the steps of:
 monitoring at least one prescribed portion of a control channel resource of an incoming control channel to detect an incoming uplink traffic channel request from at least one mobile unit to which said at least one prescribed portion of said control channel resource is exclusively dedicated, said traffic channel request being periodically repeatedly transmitted by said at least one mobile unit;
 determining whether any uplink traffic channel requests have been received and, if an uplink traffic channel request has been detected, assigning a traffic channel to said at least one requesting mobile unit;
 in response to a determination that at least one request has been received, transmitting a request response message including said traffic channel assignment to said at least one requesting mobile unit;

wherein said at least one mobile unit and said base station a priori know the location of said prescribed portion of said control channel resource in said control channel, wherein control header information that indicates at least a structure of said control message is not required to be transmitted with said uplink traffic channel requests; and utilizing said received traffic channel request to determine the true value of said received traffic channel request by subtracting an amount of traffic channel resource that has been assigned to said mobile unit that is not known to the mobile unit as being assigned at the time said mobile unit transmitted an uplink traffic channel request from an amount of said traffic channel resource requested in said transmitted uplink traffic channel request.

13. The method as defined in claim 12 wherein said wireless communications base station is for use in an orthogonal frequency division multiplex multiple access wireless communication system.

14. The method as defined in claim 12 wherein said request response message includes a traffic channel assignment for said at least one mobile unit.

15. The method as defined in claim 12 including a step of utilizing said true value of said traffic channel request to generate a traffic channel assignment for said at least one mobile unit that transmitted the traffic channel request.

16. A method for use in a wireless mobile communication system including a plurality of mobile units and at least one base station comprising the steps of:

in each of said mobile units generating a control channel including a prescribed control channel resource, said control channel being dedicated exclusively to a particular mobile unit and having a prescribed portion of said control charnel resource reserved to transport uplink traffic channel requests, wherein each mobile unit has a distinct control channel and contention is eliminated on said uplink, transmitting said uplink traffic channel requests in said prescribed portion of said control channel resource to a base station, receiving a response including an uplink channel assignment from said base station, and controlling said transmitting to periodically repeating transmission of said uplink traffic channel request in prescribed one or more of said one or more time slots prior to said particular mobile unit receiving a response from said base station, wherein said particular mobile unit and said base station a priori know the location of said prescribed portion of said control channel resource in said control channel, wherein there is no need to include control header information that indicates at least a structure of said control message with said uplink traffic channel requests; and in said at least one base station monitoring at least one prescribed portion of a control channel resource of an incoming control channel to detect an incoming uplink traffic channel request from at least one mobile unit to which said at least one prescribed portion of said control channel resource is exclusively dedicated, said traffic channel request being periodically repeatedly transmitted by said at least one mobile unit, determining whether any uplink traffic channel requests have been received and, if an uplink traffic channel request has been detected, assigning a traffic channel to said at least one requesting mobile unit, in responsive to a determination that at least one request has been received, transmitting a request response message including said traffic channel assignment to said at least one requesting mobile unit, wherein said at least one mobile unit and said base station a priori know the location of said prescribed portion of said control channel resource in said control channel, wherein control header information is not required to be transmitted with said uplink traffic channel requests, and utilizing said received traffic channel request to determine the true value of said received traffic channel request by subtracting an amount of traffic channel resource that has been assigned to said mobile unit that is not known to the mobile unit as being assigned at the time said mobile unit transmitted an uplink traffic channel request from an amount of said traffic channel resource requested in said transmitted uplink traffic channel request.

17. The system as defined in claim 16 wherein said wireless mobile communication system is an orthogonal frequency division multiplex multiple access wireless mobile communication system.

\* \* \* \* \*